US008508559B2

(12) United States Patent
Kwon et al.

(10) Patent No.: US 8,508,559 B2
(45) Date of Patent: Aug. 13, 2013

(54) METHOD OF DRIVING A LIGHT SOURCE, METHOD OF DISPLAYING AN IMAGE USING THE SAME, AND DISPLAY APPARATUS FOR PERFORMING THE SAME

(75) Inventors: Nam-Ok Kwon, Asan-si (KR); Jong-Seo Lee, Hwaseong-si (KR); Gi-Chang Park, Yongin-si (KR); Hoe-Rim Choe, Asan-si (KR); Tae-Ho Kim, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 390 days.

(21) Appl. No.: 12/938,817

(22) Filed: Nov. 3, 2010

(65) Prior Publication Data

US 2011/0175552 A1 Jul. 21, 2011

(30) Foreign Application Priority Data

Jan. 20, 2010 (KR) ............................ 2010-0005206

(51) Int. Cl.

| | |
|---|---|
| ***G09G 5/10*** | (2006.01) |
| ***G09G 3/16*** | (2006.01) |
| ***G09G 3/18*** | (2006.01) |
| ***G09G 5/00*** | (2006.01) |
| ***G06F 3/038*** | (2006.01) |
| *G05F 1/00* | (2006.01) |
| *H05B 37/02* | (2006.01) |
| *H05B 39/04* | (2006.01) |
| *H05B 41/36* | (2006.01) |

(52) U.S. Cl.

USPC ............... 345/690; 315/291; 345/48; 345/50; 345/204; 345/205; 345/214

(58) Field of Classification Search

None

See application file for complete search history.

(56) References Cited

U.S. PATENT DOCUMENTS

| | | | | |
|---|---|---|---|---|
| 7,952,555 | B2 * | 5/2011 | Sakai | 345/102 |
| 2006/0114218 | A1 * | 6/2006 | Ho et al. | 345/102 |
| 2009/0251400 | A1 | 10/2009 | Liu et al. | |

FOREIGN PATENT DOCUMENTS

| | | |
|---|---|---|
| JP | 05-188869 | 7/1993 |
| JP | 09-026837 | 1/1997 |
| JP | 2001-184046 | 7/2001 |
| JP | 2004-246099 | 9/2004 |
| KR | 1020000026552 | 5/2000 |
| KR | 1020040029220 | 4/2004 |
| KR | 1020060120673 | 11/2006 |
| KR | 1020080038040 | 5/2008 |

* cited by examiner

*Primary Examiner* — Douglas W Owens
*Assistant Examiner* — Dedei K Hammond
(74) *Attorney, Agent, or Firm* — H.C. Park & Associates, PLC

(57) ABSTRACT

A method of driving a light source includes converting a reference luminance value of the light source to a first just noticeable difference (JND) value. The JND value represents a minimum noticeable difference between two stimuli. A target luminance value lower than the reference luminance value is determined using the first JND value. A first driving signal applied to the light source is generated using the target luminance value so that a user may not notice a luminance change when a luminance value of a light source is decreased in order to decrease power consumption of a display apparatus.

17 Claims, 8 Drawing Sheets

FIG. 2

| NEMA-DICOM JND GRAYSCALE | | | | | | | | | | |
|---|---|---|---|---|---|---|---|---|---|---|
| JND | L(cd/m$^2$) | ⋮ | ⋮ | ⋮ | 623 | 283.335 | ⋮ | ⋮ | 979 | 2960.96 |
| 1 | 0.04999 | ⋮ | ⋮ | ⋮ | 624 | 285.337 | ⋮ | ⋮ | 989 | 2960.20 |
| 2 | 0.05469 | ⋮ | ⋮ | ⋮ | 625 | 287.301 | ⋮ | ⋮ | 981 | 2999.54 |
| ⋮ | ⋮ | ⋮ | ⋮ | ⋮ | ⋮ | ⋮ | ⋮ | ⋮ | ⋮ | ⋮ |
| 7 | 0.08070 | ⋯ | ⋯ | ⋯ | 630 | 297.311 | ⋮ | ⋮ | ⋮ | ⋮ |
| 8 | 0.08661 | ⋯ | ⋯ | ⋯ | 631 | 299.352 | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | 1023 | 3935.71 |
| 72 | 1.0129 | ⋮ | 606 | 252.083 | 695 | 451.573 | ⋮ | ⋮ | | |
| 73 | 1.0376 | ⋮ | 607 | 253.830 | 696 | 454.675 | ⋮ | ⋮ | | |
| ⋮ | ⋮ | ⋮ | ⋮ | ⋮ | ⋮ | ⋮ | ⋮ | ⋮ | | |

METHOD OF DRIVING A LIGHT SOURCE, METHOD OF DISPLAYING AN IMAGE USING THE SAME, AND DISPLAY APPARATUS FOR PERFORMING THE SAME

CROSS REFERENCE TO RELATED APPLICATION

This application claims priority from and the benefit of Korean Patent Application No. 2010-5206, filed on Jan. 20, 2010, which is hereby incorporated by reference for all purposes as if fully set forth herein.

BACKGROUND OF THE INVENTION

1. Field of the Invention

Exemplary embodiments of the present invention relate to a method of driving a light source, a method of displaying an image using the method, and a display apparatus for performing the method of driving the light source. More particularly, exemplary embodiments of the present invention relate to a method of driving a light source capable of decreasing power is consumption, a method of displaying an image using the method, and a display apparatus for performing the method of driving the light source.

2. Discussion of the Background

Generally, a liquid crystal display (LCD) apparatus may be a thin, light-weight and low power consumer of energy so that the LCD apparatus may be broadly used as a mobile device having a display apparatus. In addition, as the size of the display apparatus increases, demand for the LCD apparatus may increase as compared to a cathode ray tube (CRT) apparatus, which may have a spatial restriction.

Some mobile display apparatus may include a mobile phone, a personal digital assistant (PDA), a laptop computer, a navigation terminal, and a portable video game console.

The LCD apparatus may include an LCD panel to display an image using variable light transmission through a liquid crystal from a backlight assembly disposed under the LCD panel to provide light to the LCD panel. The backlight assembly may include a plurality of light emitting diodes (LEDs) as light sources.

In the mobile display apparatus, minimizing the power consumption may be important. The mobile display apparatus may depend upon a battery since it may be portable. In order to optimize the operating time of the mobile display apparatus, the power consumption of the mobile display apparatus may be minimized.

SUMMARY OF THE INVENTION

Exemplary embodiments of the present invention provide a method of driving a light source capable of changing luminance without a user's awareness of the variation in the luminance.

Additional features of the invention will be set forth in the description that follows and, in part, will be apparent from the description or may be learned by practice of the invention.

An exemplary embodiment of the present invention discloses a method of driving a light source that comprises converting a reference luminance value of the light source to a first just noticeable difference (JND) value, the JND value representing a minimum noticeable difference between two stimuli; determining a target luminance value lower than the reference luminance value using the first JND value; and generating a first driving signal applied to the light source using the target luminance value.

An exemplary embodiment of the present invention also discloses a method of displaying an image that comprises analyzing an input image to compensate a color temperature of the input image; displaying the compensated input image on a display panel; converting a reference luminance value of a light source to a first just noticeable difference (JND) value, the light source providing light to the display panel, and the JND value representing a minimum noticeable difference between two stimuli; determining a target luminance value lower than the reference luminance value using the first JND value; generating a first driving signal using the target luminance value and applying the first driving signal to the light source; and providing the light to the display panel in response to the first driving signal.

An exemplary embodiment of the present invention also discloses a display apparatus that comprises a display panel to display an image; a light source part comprising a light source to provide light to the display panel; a luminance determining part to convert a reference luminance value of the light source to a first just noticeable difference (JND) value and to determine a target luminance value that is lower than the reference luminance value using the first JND value, and the JND value representing a minimum noticeable difference between two is stimuli; and a light source driver to generate a first driving signal corresponding to the target luminance value and to apply the first driving signal to the light source It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIG. 2 is a conceptual diagram of a look-up table stored in the luminance determining part of FIG. 1.

DETAILED DESCRIPTION OF THE ILLUSTRATED EMBODIMENTS

Figure 1:
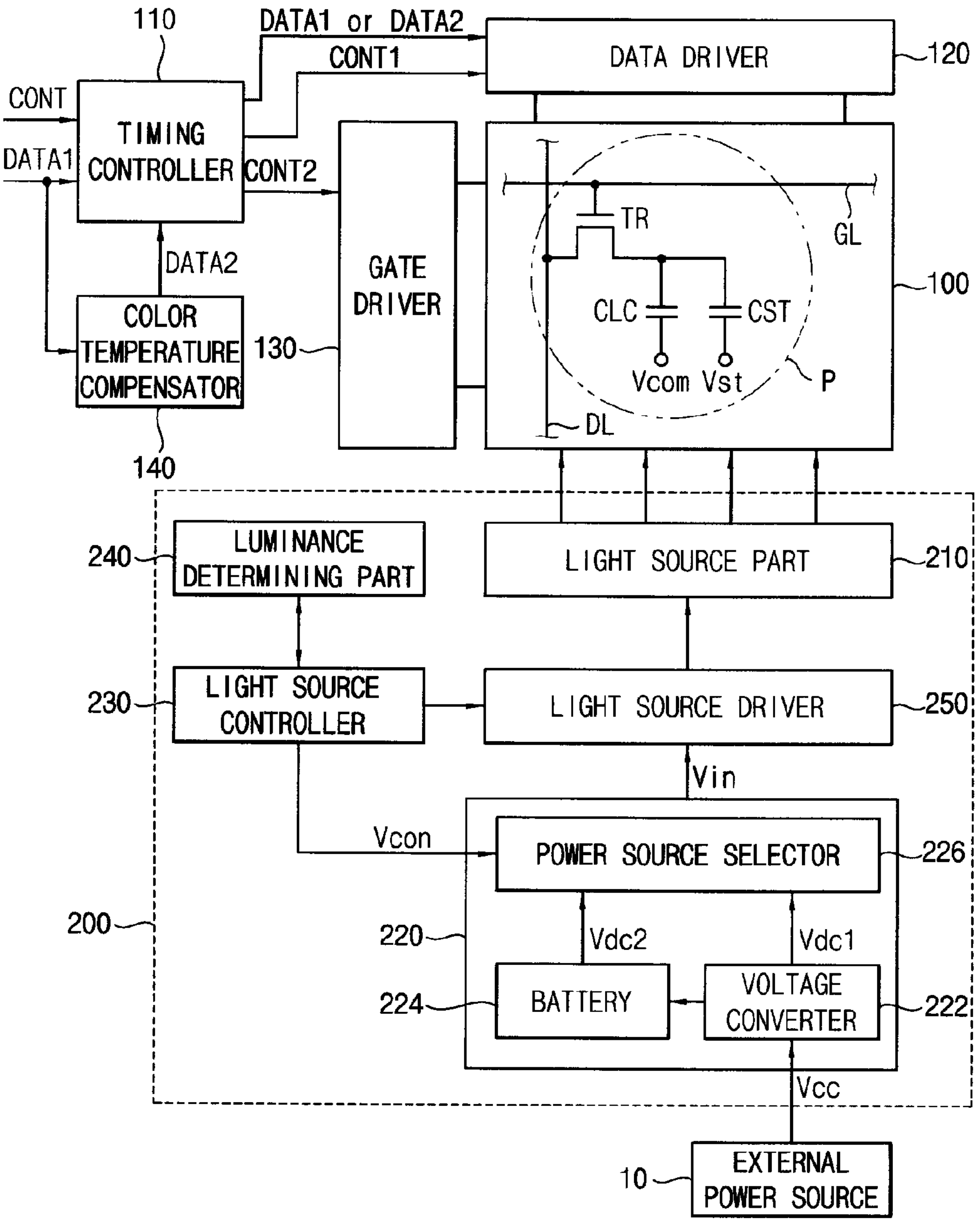
FIG. 1 is a block diagram of a display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, connected, or coupled to the other element or layer, or intervening elements or layers may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, third, etc. may be used is herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or is groups thereof.

Exemplary embodiments of the present invention are described herein with reference to cross-sectional views that schematically show idealized exemplary embodiments (and intermediate structures) of the present invention. As such, variations from the shapes of the drawings as a result, for example, of manufacturing techniques and/or tolerances, are to be expected. Thus, exemplary embodiments of the present invention should not be construed as limited to the particular shapes of regions shown herein but are to include deviations in shapes that result, for example, from manufacturing. For example, an implanted region shown as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions shown in the figures are schematic in nature and their shapes are not intended to show the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is a block diagram of a display apparatus according to an exemplary embodiment of the present invention.

Referring to FIG. 1, the display apparatus according to the present exemplary embodiment includes a display panel 100, a timing controller 110, a data driver 120, a gate driver 130, a color temperature compensator 140, and a light source apparatus 200.

The display panel 100 includes a plurality of gate lines GL, a plurality of data lines DL, and a plurality of pixels P to display an image according to gate signals and data signals respectively input through the gate lines GL and the data lines DL. Each pixel P includes a switching element TR, which is connected to the gate lines GL, the data lines DL, a liquid crystal capacitor CLC, and a storage capacitor CST. The liquid crystal capacitor CLC includes a first terminal connected to a pixel electrode that is connected to a drain electrode of the switching element TR and a second terminal connected to a common electrode to receive a common voltage Vcom. The storage capacitor CST includes a first terminal connected to the pixel electrode that is connected to the drain electrode of the switching element TR and a second terminal connected to a storage line receiving a storage voltage Vst. The display panel 100 may include a display substrate, an opposite substrate facing the display substrate, and a liquid crystal layer disposed between the display substrate and the opposite substrate.

The timing controller 110 receives a control signal CONT and an input image signal DATA1 from a source or sources. The control signal CONT may include a main clock signal, a vertical synchronizing signal, a horizontal synchronizing signal, and a data enable signal. The timing controller 110 generates a first control signal CONT1 to control a driving timing of the data driver 120 and a second control signal CONT2 to control a driving timing of the gate driver 130 using the control signal CONT. The first control signal CONT1 may include is a horizontal start signal, a load signal, and a data clock signal. The second control signal CONT2 may include a vertical start signal, a gate clock signal, and an output enable signal.

The data driver 120 generates the data signal using the first control signal CONT1 provided from the timing controller 110 and the input image signal DATA1 or a compensated image signal DATA2 that is compensated by the color temperature compensator 140. The data driver 120 provides the data signal to the data lines DL.

The gate driver 130 generates and provides the gate signal to activate the gate lines GL using the second control signal CONT2 provided from the timing controller 110.

The color temperature compensator 140 may determine whether the input image signal DATA1 needs to be compensated according to analysis of the input image signal DATA1. For example, the color temperature compensator 140 compensates a color temperature of the input image signal DATA1 to generate the compensated image signal DATA2 when a ratio of an achromatic color image signal having a grayscale greater than or equal to a reference grayscale in the input image signal DATA1 is greater than a reference ratio. For example, the reference grayscale may be 200 grayscales. The color temperature compensator 140 may compensate the color temperature of the input image signal DATA1 by increasing a color temperature of blue data B in a set of red data R, green data G, and the blue data B corresponding to the achromatic color image signal having the grayscale greater than or equal to the reference grayscale.

The light source apparatus 200 may include a light source part 210, a power generator 220, a light source controller 230, a luminance determining part 240, and a light source driver 250.

The light source part 210 may include a plurality of light sources. The light source may include a point light source such as a light emitting diode (LED) and may include red is LEDs to emit red light, green LEDs to emit green light, and blue LEDs to emit blue light.

The power generator 220 includes a voltage converter 222, a battery 224, and a power source selector 226.

The voltage converter 222 converts an alternating current (AC) voltage Vcc applied from an external power source 10 to a first direct current (DC) voltage Vdc1 and outputs the first DC voltage Vdc1 to the battery 224 and the power source selector 226.

The battery 224 generates a second DC voltage Vdc2. The battery 224 is charged by the first DC voltage Vdc1 applied from the voltage converter 222.

The power source selector 226 selects the first DC voltage Vdc1 or the second DC voltage Vdc2 according to a power source selecting signal Vcon applied from the light source controller 230. Herein, a voltage outputted from the power source selector 226 is defined as an input voltage Vin. The power source selector 226 may select the first DC voltage Vdc1 in an external power source mode and the second DC voltage Vdc2 in a battery mode.

The light source controller 230 generates the power source selecting signal Vcon and provides the power source selecting signal Vcon to the power source selector 226. The light source controller 230 also selectively outputs a reference luminance value of the light source or a target luminance value that is lower than the reference luminance value of the light source to the light source driver 250 according to a power source mode. The target luminance value is determined by the luminance determining part 240. The light source controller 230 may output the reference luminance value when the power source mode is the external power source mode. The light source controller 230 outputs the target luminance value when the power source mode is the battery mode.

The luminance determining part 240 converts the reference luminance value to a is just noticeable difference (JND) value that represents a minimum noticeable difference between two stimuli, which are typically optical stimuli pertaining to luminance. The luminance determining value 240 determines the target luminance value using the JND value.

The luminance determining part 240 determines a first JND value corresponding to the reference luminance value. The luminance determining part 240 determines a second JND value by subtracting a JND reference value from the first JND value. Herein, the JND reference value is determined based on the time required for a human to notice a luminance change according to a JND difference (ΔJND). The luminance determining part 240 converts the second JND value to a luminance value to determine the target luminance value.

As the ΔJND increases, the difference between the reference luminance value and the target luminance value increases. For example, when the target luminance value is much less than the reference luminance value, the power consumption may be decreased. However, as the ΔJND increases, the minimum time required to change luminance without a human's awareness also increases. Thus, the time required for a human to notice the luminance change has to be considered when determining the JND reference value.

Table 1 shows experimental results on a relationship between the reference luminance value, ΔJND, and the minimum time required to change the luminance without the human's awareness.

TABLE 1

| | Reference Luminance Value | | |
|---|---|---|---|
| | 300 cd/m$^2$ | 250 cd/m$^2$ | 200 cd/m$^2$ |
| ΔJND | | Minimum Time (s) | |
| 0 | 0 | 0 | 0 |
| 20 | 4 | 2 | 2 |
| 25 | 10 | 9 | 8 |
| 30 | over 30 | over 30 | over 30 |

In the experiment, the target luminance values were determined according to the ΔJND when the reference luminance values were respectively 300 cd/m$^2$, 250 cd/m$^2$, and 200 cd/m$^2$. Then the minimum time required to change the luminance without the human's awareness on the difference between the reference luminance value and the target luminance value was measured. As shown in Table 1, the minimum time was lower than or equal to 10 seconds when the ΔJND was lower than or equal to 25. However, the minimum time was greater than 30 seconds when the ΔJND was 30. For example, a human may be aware of the luminance change, even though the luminance is decreased with an interval not less than 30 seconds when the ΔJND is not less than 30. Thus, the minimum time required to change the luminance without the human's awareness should be considered when determining the JND reference value.

The luminance determining part 240 may determine the first JND value corresponding to the reference luminance value and may determine the target luminance value corresponding to the second JND value by using a look-up table in which the JND values and the corresponding luminance values are stored.

FIG. 2 is a conceptual diagram of a look-up table stored in the luminance determining part of FIG. 1.

The look-up table shown in FIG. 2 is defined by Digital Imaging and Communications in Medicine (DICOM) and represents a minimum luminance deviation noticeable by visual characteristics of a human analyzed by experimentation. Referring to data in the look-up table shown in FIG. 2, a human may not be aware of light having the luminance is value lower than 0.04999 nit (cd/m$^2$) and may be initially aware of the light having the luminance value substantially equal to 0.04999 nit (cd/m$^2$). Luminance difference between light having the luminance value substantially equal to 0.05469 nit (cd/m$^2$) and light having the luminance value substantially equal to 0.04999 nit (cd/m$^2$) may be noticeable. In contrast, the luminance difference between the light having the luminance value lower than 0.05469 nit (cd/m$^2$) and the light having the luminance value substantially equal to 0.04999 nit (cd/m$^2$) may not be noticeable.

Now, a method of determining the target luminance value using a look-up table is briefly explained. For example, when the reference luminance value is about 300 nit (cd/m$^2$), the first JND value corresponding to the reference luminance value is about 631. When the JND reference value is 25, the second JND value is 606 as determined by subtracting 25 from 631. Consequently, the target luminance value corresponding to the second JND value of 606 is about 252 nit (cd/m$^2$).

The luminance determining part 240 may determine the first JND value corresponding to the reference luminance value using Equation 1 below.

$$JNDi = A + B\times\log_{10}(Li) + C\times(\log_{10}(Li))^2 + D\times(\log_{10}(Li))^3 + E\times(\log_{10}(Li))^4 + F\times(\log_{10}(Li))^5 + G\times(\log_{10}(Li))^6 + H\times(\log_{10}(Li))^7 + I\times(\log_{10}(Li))^8 \quad \text{[Equation 1]}$$

Here, Li represents the reference luminance value, and JNDi represents the first JND value corresponding to the reference luminance value. The constant A is about 71.498068; the constant B is about 94.593053; the constant C is about 41.912053; the constant D is about 9.8247004; the constant E is about 0.28175407; the constant F is about −1.1878455; the constant G is about −0.18014349; the constant H is about 0.14710899; and the constant I is about −0.017046845.

In addition, the luminance determining part 240 may determine the target luminance value corresponding to the second JND value using Equation 2 below.

$$\log_{10}[L_j] = \frac{a + c\times\ln(JNDj) + e(\ln(JNDj))^2 + g(\ln(JNDj))^3 + m(\ln(JNDj))^3}{1 + b\times\ln(JNDj) + d(\ln(JNDj))^2 + f(\ln(JNDj))^3 + h(\ln(JNDj))^4 + k(\ln(JNDj))^5} \quad \text{[Equation 2]}$$

Herein, Lj represents the target luminance value, and JNDj represents the second JND value. The constant a is about −1.3011877; the constant b is about −2.5840191×10$^{-2}$; the constant c is about 8.2042636×10$^{-2}$; the constant d is about −1.0320229×10$^{-1}$; the constant e is about 1.3646699×10$^{-1}$; the constant f is about 2.8745620×10$^{-2}$; the constant g is about −2.5468404×10$^{-2}$; the constant h is about −3.1978977×10$^{-3}$; the constant k is about 1.2992634×10$^{-4}$; and the constant m is about 1.3635334×10$^{-3}$.

The light source driver 250 generates a first driving signal corresponding to the target luminance value and/or a second driving signal corresponding to the reference luminance value. The light source driver 250 drives the light source part 210 using the first driving signal and/or the second driving signal. The first and second driving signals may be pulse width modulation (PWM) signals. A level of the first driving signal is lower than that of the second driving signal.

Figure 3:
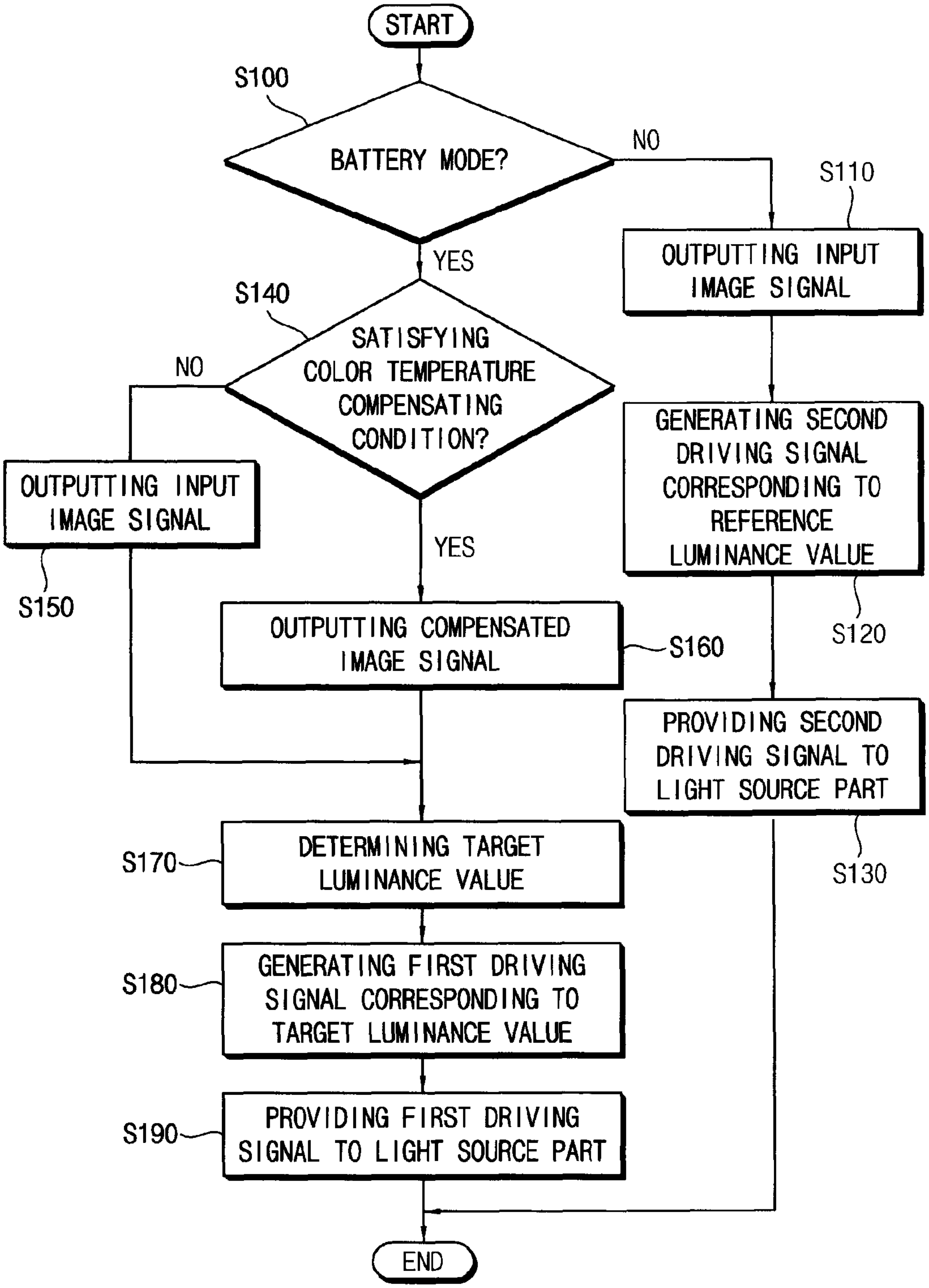
FIG. 3 is a flow chart for a method of displaying an image performed by the display apparatus of FIG. 1.
Figure 4:
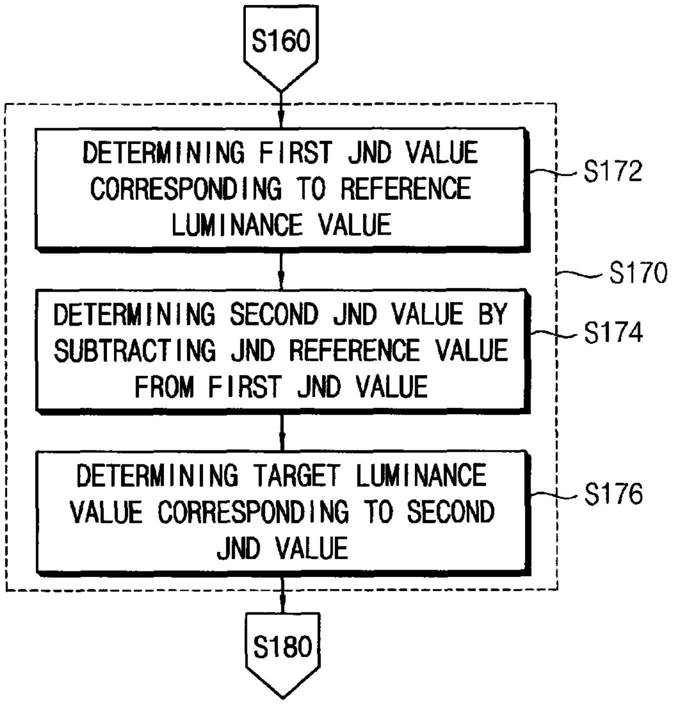
FIG. 4 is a flow chart for a method of determining the target luminance value of FIG. 3.

FIG. 3 is a flow chart for a method of displaying an image performed by the display apparatus of FIG. 1. FIG. 4 is a flow chart for a method of determining the target luminance value of FIG. 3.

Referring to FIG. 1, FIG. 3, and FIG. 4, when the power source mode is the external power source mode (step S100), the timing controller 110 outputs the input image signal DATA1 to the data driver 120 (step S110).

The light source controller 230 outputs the reference luminance value to the light source driver 250. The light source driver 250 generates the second driving signal (step S120) and provides the second driving signal to the light source part 210 (step S130).

When the power source mode is the battery mode, the color temperature compensator 140 determines whether the input image signal DATA1 satisfies a color temperature compensating condition (step S140). For example, the color temperature compensator 140 may determine that the input image signal DATA1 satisfies the color temperature compensating condition when the ratio of the achromatic color image signal in the input image signal DATA1 is greater than the reference ratio. For example, the reference grayscale may be 200 grayscales.

When the input image signal DATA1 does not satisfy the color temperature compensating condition, the color temperature compensator 140 does not compensate the input image signal DATA1 and outputs the input image signal DATA1. The timing controller 110 outputs the input image signal DATA1 to the data driver 120 (step S150).

When the input image signal DATA1 satisfies the color temperature compensating condition, the color temperature compensator 140 compensates the achromatic color image signal having the grayscale greater than or equal to the reference grayscale in the input image signal DATA1 to generate the compensated image signal DATA2. The timing controller 110 outputs the compensated image signal DATA2 to the data driver 120 (step S160).

The light source controller 230 controls the luminance determining part 240 to is determine the target luminance value. The luminance determining part 240 determines the target luminance value using the first JND value corresponding to the reference luminance value (step S170).

Hereinafter, the step S170 is explained with reference to FIG. 4. The luminance determining part 240 determines the first JND value corresponding to the reference luminance value (step S172). The luminance determining part 240 determines the second JND value by subtracting the JND reference value from the first JND value (step S174).

Then, the luminance determining part 240 determines the target luminance value corresponding to the second JND value (step S176). The light source controller 230 provides the target luminance value determined by the luminance determining part 240 to the light source driver 250.

The light source controller 230 outputs the target luminance value to the light source driver 250. The light source driver 250 generates the first driving signal corresponding to the target luminance value (step S180) and provides the first driving signal to the light source part 210 (step S190).

The light source part 210 generates light in response to the first driving signal and provides the light to the display panel 100.

When the color temperature of the input image signal DATA1 is compensated so as to be increased, the target luminance value of the light source part 210 may be decreased, and, thus, the power consumption may be decreased.

Figure 5:
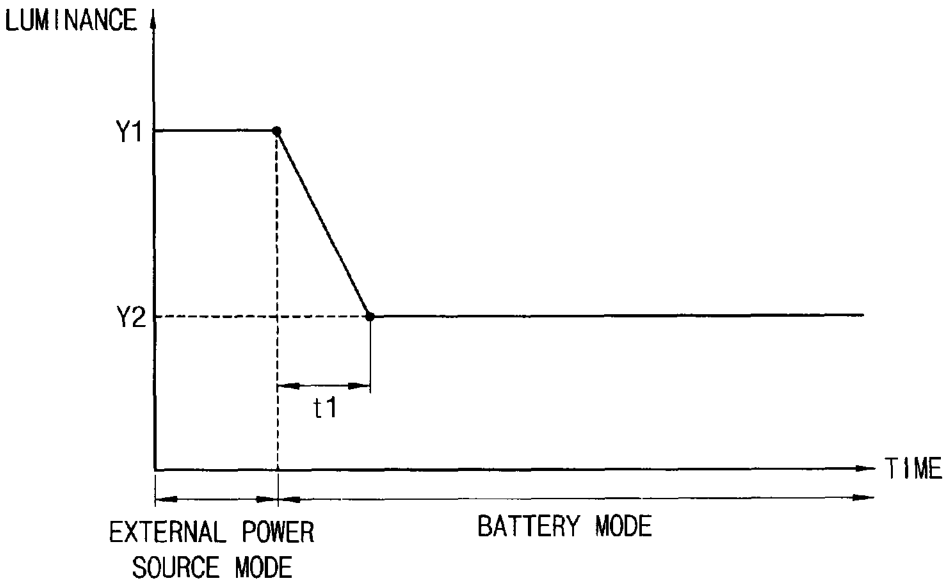
FIG. 5 is a graph showing a luminance change according to a method of driving a light source part of FIG. 3.

FIG. 5 is a graph showing a luminance change according to the method of driving the light source part of FIG. 3.

Referring to FIG. 1, FIG. 3, and FIG. 5, the light source part 210 is driven by the is second driving signal and outputs a first luminance value Y1 in the external power source mode.

When the power source mode is switched from the external power source mode to the battery mode, the luminance value of the light source part 210 is gradually decreased from the first luminance value Y1 to a second luminance value Y2, which is lower than the first luminance value Y1, during a first reference interval t1. Herein, the first reference interval t1 corresponds to the time required to change the first luminance value Y1 to the second luminance value Y2 without a user's awareness. The first reference interval t1 may be from several seconds to several dozens of seconds.

When the power source mode is switched from the external power source mode to the battery mode, the light source controller 230 provides the target luminance value to the light source driver 250. The light source controller 230 sequentially provides the luminance values from the reference luminance value to the target luminance value to the light source driver 250 to gradually decrease the luminance value of the light source part 210.

From the time when the first reference interval t1 passes, i.e., the first reference interval expires, to a later time when the power source mode returns to the external power source mode, the luminance value of the light source part 210 maintains the second luminance value Y2.

According to the present exemplary embodiment, the target luminance value is determined considering visual characteristics of a human, and the luminance value of the light source part 210 is gradually decreased so that a user may not to be aware of the luminance change. Thus, the user may not be aware of the luminance change when the luminance value of the light source part 210 is decreased in order to decrease the power consumption during a time when the display panel is operated in the battery mode.

Figure 6:
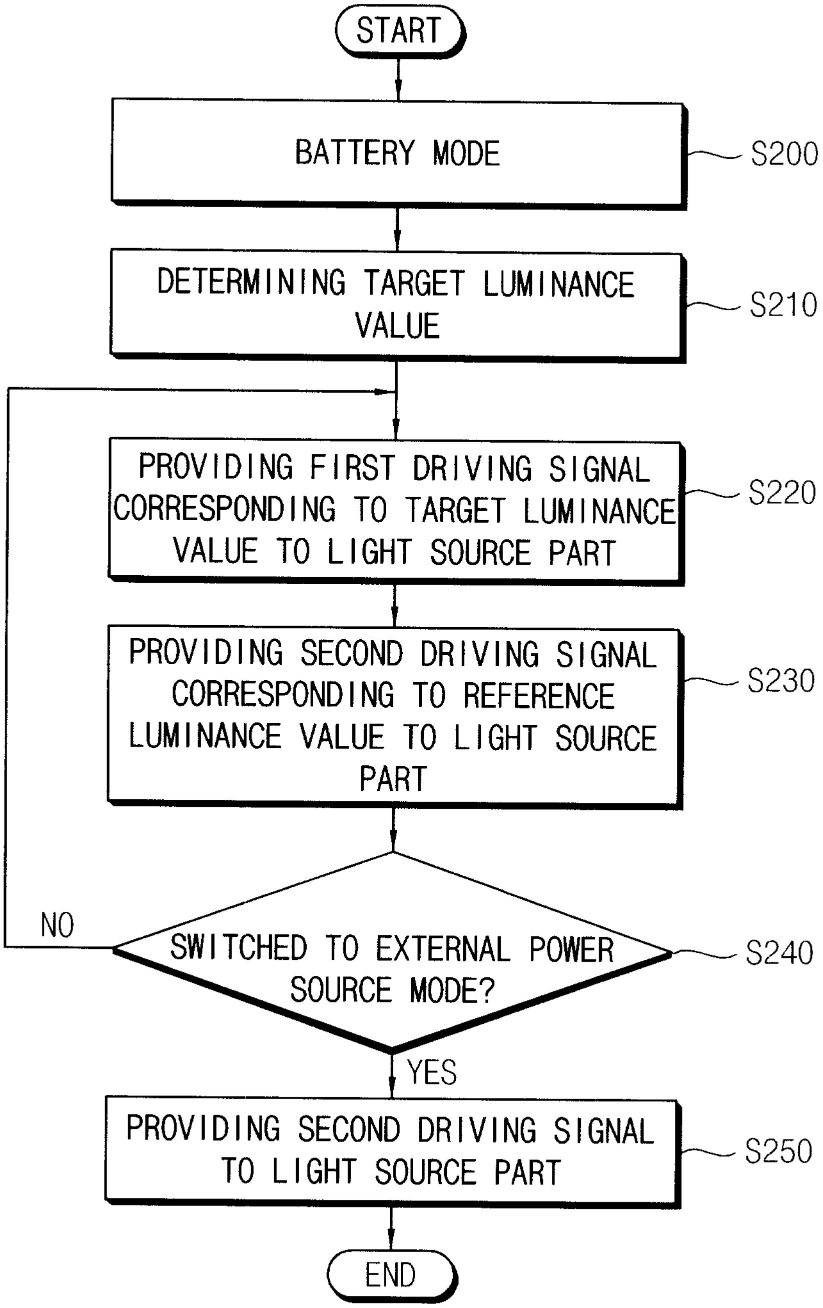
FIG. 6 is a flow chart for a method of driving a light source part according to another exemplary embodiment of the present invention.

FIG. 6 is a flow chart for a method of driving a light source part according to another exemplary embodiment of the present invention.

A display apparatus according to the present exemplary embodiment is substantially the same as the display apparatus according to the previous exemplary embodiment shown in FIG. 1. In addition, a method of displaying an image according to the present exemplary embodiment is substantially similar to the method of displaying an image according to the previous exemplary embodiment shown in FIG. 1, FIG. 2, FIG. 3, FIG. 4, and FIG. 5 except for the method of driving the light source part 210. Thus, the same reference numerals will be used to refer to the same or like parts as those described in the previous exemplary embodiment, but repetitive explanation concerning the above-described elements will be omitted.

Referring to FIG. 1, FIG. 2, FIG. 3, FIG. 4, FIG. 5, and FIG. 6, when the power source mode is the battery mode (step S200), the light source controller 230 controls the luminance determining part 240 to determine the target luminance value.

The luminance determining part 240 determines the second JND value using the JND reference value and the first JND value corresponding to the reference luminance value. The luminance determining part 240 determines the target luminance value using the second JND value (step S210). The light source controller 230 provides the target luminance value determined by the luminance determining part 240 to the light source driver 250. The method of determining the target luminance value is substantially similar to the method of determining the target luminance value of the previous exemplary embodiment as explained above with reference to FIG. 4.

The light source driver 250 generates the first driving signal corresponding to the is target luminance value and provides the first driving signal to the light source part 210 (step S220).

The light source controller 230 provides the reference luminance value to the light source driver 250 to increase the luminance value of the light source part 210. The light source driver 250 generates the second driving signal corresponding to the reference luminance value and provides the second driving signal to the light source part 210 (step S230).

The light source controller 230 repeatedly performs the steps S220 and S230 until the power source mode is switched from the battery mode to the external power source mode. The light source controller 230 alternately provides the reference luminance value and the target luminance value to the light source driver 250 to periodically decrease and increase the luminance value of the light source part 210 while in the battery mode.

When the power source mode is switched to the external power source mode (step S240), the light source controller 230 provides the reference luminance value to the light source driver 250. The light source driver 250 generates the second driving signal corresponding to the reference luminance value and provides the second driving signal to the light source part 210 (step S250).

Although not shown, when the power source mode is switched to the external power source mode, the light source controller 230 may optionally alternately provide the reference luminance value and the target luminance value to the light source driver 250 in order to conserve energy usage. The light source driver 250 may subsequently alternately generate the second driving signal corresponding to the reference luminance value and the first driving signal corresponding to the target luminance value, which are then alternately provided to the light source part 210.

Figure 7:
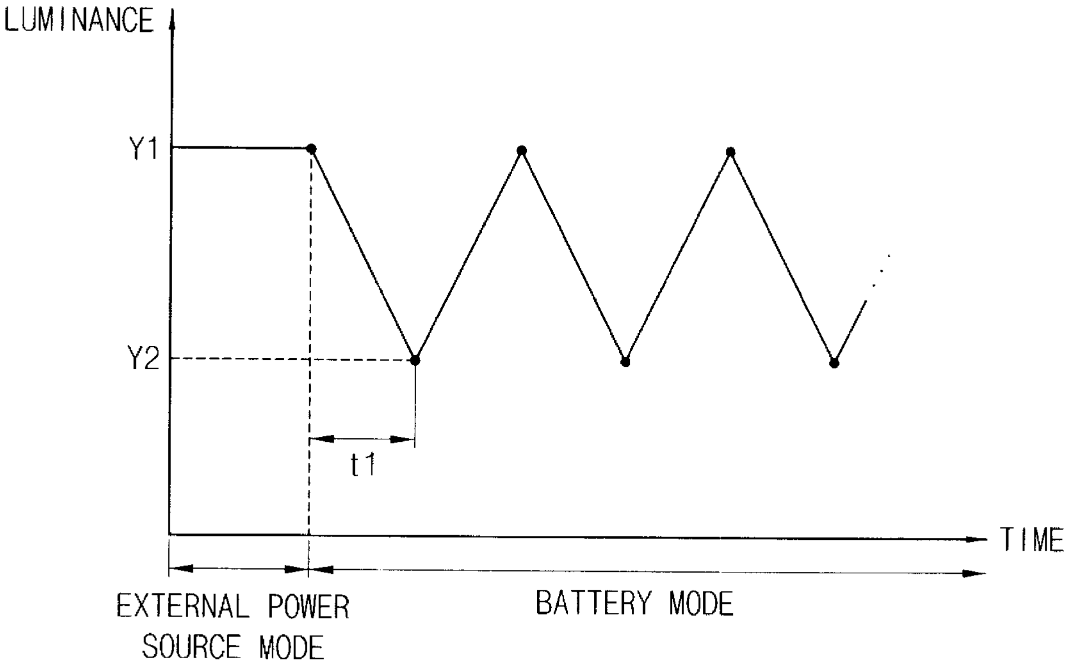
FIG. 7 is a graph showing a luminance change according to the method of driving the light source part of FIG. 6.

FIG. 7 is a graph showing a luminance change according to the method of driving the light source part of FIG. 6.

Referring to FIG. 1 and FIG. 7, the light source part 210 is driven by the second driving signal corresponding to the reference luminance value and outputs the first luminance value Y1 in the external power source mode. When the power source mode is switched from the external power source mode to the battery mode, the luminance value of the light source part 210 is gradually decreased from the first luminance value Y1 to a second luminance value Y2, which is lower than the first luminance value Y1, during a first reference interval t1. The luminance value of the light source part 210 is gradually increased from the second luminance value Y2 to the first luminance value Y1 at a time when the first reference interval t1 has passed.

The light source controller 230 sequentially provides the reference luminance value and the target luminance value to the light source driver 250 to gradually decrease the luminance value of the light source part 210. In addition, when the luminance value of the light source part 210 is decreased to be substantially equal to the second luminance value Y2, the light source controller 230 sequentially provides the target luminance value and the reference luminance value to the light source driver 250 to gradually increase the luminance value of the light source part 210.

When a user accustomed to a luminance circumstance that is brighter than an image displayed on the display apparatus in the battery mode views the display apparatus, the user may recognize, i.e., be aware, that the image on the display apparatus appears relatively dark when the luminance is maintained in the battery mode at the second luminance value Y2. Thus, when the luminance value of the light source part 210 is repeatedly decreased and increased, a darkness problem of the display apparatus mentioned above may be decreased even is though the user is adapted to a relatively brighter circumstance.

According to the present exemplary embodiment, the target luminance value may be determined considering visual characteristics of a human, and the luminance value of the light source part 210 may be gradually decreased in order for a user not to be aware of the luminance change. Thus, the user may not be aware of the luminance change when the luminance value of the light source part 210 is decreased in order to decrease power consumption in the battery mode.

Comparing the present exemplary embodiment to the previous exemplary embodiment that maintains the target luminance value in the battery mode shown in FIG. 1, FIG. 2, FIG. 3, FIG. 4, and FIG. 5, the overall power consumption is not lowered as much. However, the darkness problem of the display apparatus in the battery mode of the present exemplary embodiment may be decreased even though the user is adapted to relatively brighter circumstances.

Figure 8:
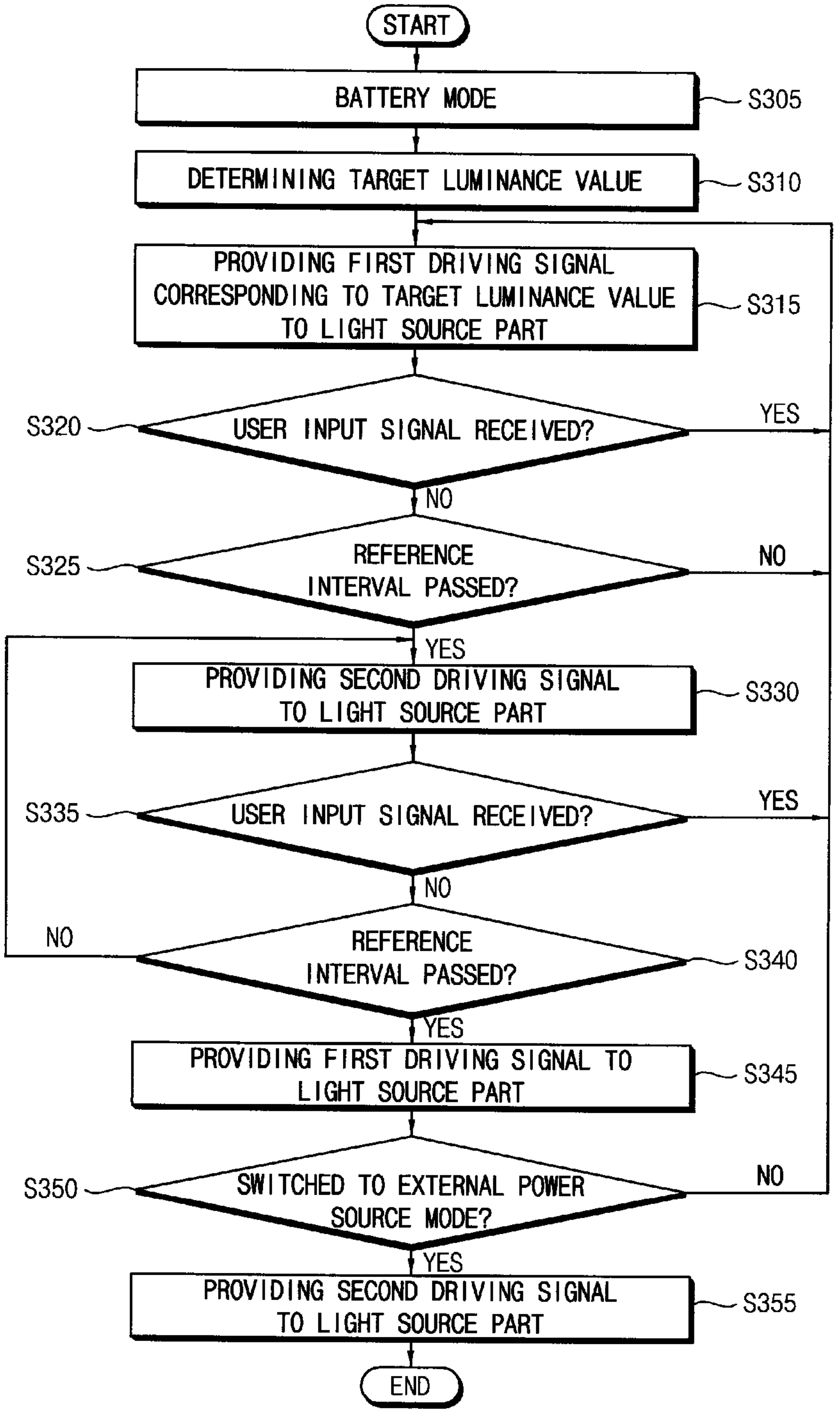
FIG. 8 is a flow chart for a method of driving a light source part according to still another exemplary embodiment of the present invention.

FIG. 8 is a flow chart for a method of driving a light source part according to still another exemplary embodiment of the present invention.

A display apparatus according to the present exemplary embodiment is substantially similar to the display apparatus according to the previous exemplary embodiment shown in FIG. 1. In addition, a method of displaying an image according to the present exemplary embodiment is substantially similar to the method of displaying an image according to the previous exemplary embodiment shown in FIG. 1, FIG. 2, FIG. 3, FIG. 4, and FIG. 5 except for the method of driving the light source part 210. Thus, the same reference numerals will be used to refer to the same or like parts as those described in the previous exemplary embodiment of FIG. 1, FIG. 2, FIG. 3, FIG. 4, and FIG. 5 so repetitive explanations concerning is the above elements will be omitted.

Referring to FIG. 1, FIG. 2, FIG. 3, FIG. 4, FIG. 5, FIG. 6, FIG. 7, and FIG. 8, when the power source mode is the battery mode (step S305), the light source controller 230 controls the luminance determining part 240 to determine the target luminance value.

The luminance determining part 240 determines the second JND value using the first JND value corresponding to the reference luminance value and the JND reference value. The luminance determining part 240 determines the target luminance value using the second JND value (step S310). The light source controller 230 provides the target luminance value determined by the luminance determining part 240 to the light source driver 250.

The light source driver 250 generates the first driving signal corresponding to the target luminance value and provides the first driving signal to the light source part 210 (step S315).

The light source controller 230 determines whether a user input signal is received (step S320). In the step S320, when the light source controller 230 determines that the user input signal is received, the light source controller 230 feeds a process back to the step S315 and then provides the target luminance value to the light source driver 250 to provide the first driving signal to the light source part 210.

Alternatively, in the step S320, when the light source controller 230 determines that the user input signal is not received, the light source controller 230 counts a period during which the user input signal is not received and determines whether the counted period is longer than a reference interval (step S325). Here, the reference interval may correspond to a time required to adapt from luminance circumstances that are different from the luminance of the display apparatus. The reference interval may be, e.g., about 10 minutes.

In the step S325, when the light source controller 230 determines that the period during which the user input signal is not received is not longer than the reference interval, the light source controller 230 provides the target luminance value to the light source driver 250 to provide the first driving signal to the light source part 210 (step S315).

In the step S325, when the light source controller 230 determines that the period during which the user input signal is not received is longer than the reference interval, the light source controller 230 provides the reference luminance value to the light source driver 250 so that the second driving signal corresponding to the reference luminance value is provided to the light source part 210. The light source driver 250 generates the second driving signal corresponding to the reference luminance value and provides the second driving signal to the light source part 210 (step S330).

The light source controller 230 determines whether the user input signal is received (step S335). In the step S335, when the light source controller 230 determines that the user input signal is received, the light source controller 230 feeds a process back to the step S315 and then provides the target luminance value to the light source driver 250 to provide the first driving signal to the light source part 210.

In the step S335, when the light source controller 230 determines that the user input signal is not received, the light source controller 230 counts a period during which the user input signal is not received and determines whether the counted period is longer than a reference interval (step S340).

In the step S340, when the light source controller 230 determines that the period during which the user input signal is not received is not longer than the reference interval, the light source controller 230 feeds a process back to the step S330. The light source controller 230 is provides the reference luminance value to the light source driver 250 so that the second driving signal is provided to the light source part 210.

In the step S340, when the light source controller 230 determines that the period during which the user input signal is not received is longer than the reference interval, the light source controller 230 provides the target luminance value to the light source driver 250 so that the first driving signal is provided to the light source part 210. The light source driver 250 generates the first driving signal corresponding to the target luminance value and provides the first driving signal to the light source part 210 (step S345).

The light source controller 230 repeatedly performs the steps S315, S320, S325, S330, S335, S340, and S345 until the power source mode is switched from the battery mode to the external power source mode.

When the power source mode is switched to the external power source mode (step S350), the light source controller 230 provides the reference luminance value to the light source driver 250 so that the second driving signal is provided to the light source part 210. The light source driver 250 generates the second driving signal and provides the second driving signal to the light source part 210 (step S355).

Figure 9:
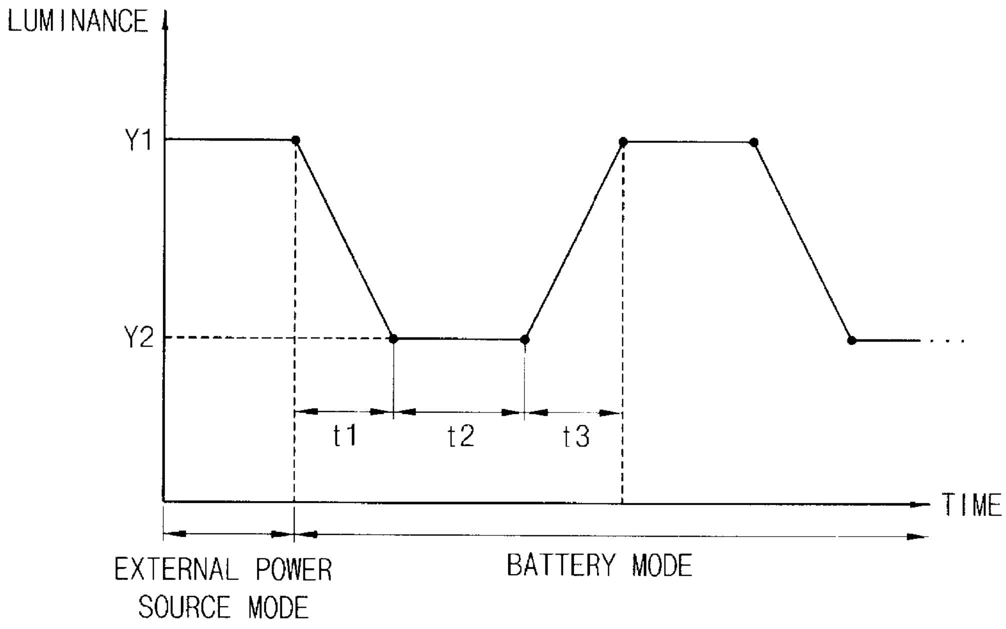
FIG. 9 is a graph showing a luminance change according to the method of driving the light source part of FIG. 8.

FIG. 9 is a graph showing a luminance change according to the method of driving the light source part of FIG. 8.

Referring to FIG. 1 and FIG. 9, the light source part 210 is driven by the second driving signal and outputs the first luminance value Y1 in the external power source mode. When the power source mode is switched from the external power source mode to the battery mode, the luminance value of the light source part 210 is gradually decreased from the first luminance value Y1 to the second luminance value Y2, which is lower than the first luminance is value Y1, during the first reference interval t1. While the user input signal is not received during second reference interval t2 with the light source part 210 having the second luminance value Y2, the light source part 210 maintains the second luminance value Y2.

The luminance value of the light source part 210 is gradually increased from the second luminance value Y2 to the first luminance value Y1 during a third reference interval t3 when the second reference interval t2 has passed without receiving the user input signal. Here, the first reference interval t1 corresponds to the time required to change the first luminance value Y1 to the second luminance value Y2 without the user's awareness. The first reference interval t1 may be several seconds or several dozens of seconds. The second reference interval t2 corresponds to the time required to be adapted to the luminance of the circumstances different from the luminance of the display apparatus. The second reference interval t2 may be about 10 minutes. The third reference interval t3 corresponds to the time required to change from the second luminance value Y2 back to the first luminance value Y1 without the user's awareness. The third reference interval t3 may be several seconds or several dozens of seconds.

When the second reference interval t2 expires without receiving the user input signal with the light source part 210 having the first luminance value Y1 or when the user input signal is received during the second reference interval t2, the luminance value of the light source part 210 is decreased gradually from the first luminance value Y1 to the second luminance value Y2.

According to the present exemplary embodiment, the target luminance value may be determined from considering visual characteristics of a human, and the luminance value of the light source part 210 may be gradually decreased in order for a user not to be aware of the luminance change. Thus, the user may not be aware of the luminance change even though the is luminance value of the light source part 210 is decreased in order to decrease the power consumption in the battery mode.

Comparing the present exemplary embodiment to the previous exemplary embodiment of repeatedly decreasing and increasing the luminance value of the light source part 210 shown in FIG. 6 and FIG. 7, the power consumption may be less in the battery mode by increasing the luminance value of the light source part 210 when satisfying specified conditions.

As described above, according to exemplary embodiments of the present invention, the target luminance value may be determined considering visual characteristics of a human so that the user may not be aware of the luminance change when decreasing the power consumption of the display apparatus. In addition, when the color temperature of the input image signal DATA1 is compensated, the target luminance value of the light source may be decreased, and the power consumption may be more decreased.

In addition, the darkness problem of the display apparatus may be suppressed when a user is accustomed to brighter luminance circumstances than the image displayed on the display apparatus in the battery mode.

In addition, the power consumption may be decreased as well as preventing the darkness problem in the battery mode by increasing the luminance value of the light source when satisfying specified conditions.

The foregoing is illustrative of the present invention and is not to be construed as limiting it. It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of driving a light source, comprising:

converting a reference luminance value of the light source to a first just noticeable difference (JND) value, JND values representing a minimum noticeable difference between two stimuli;

determining a second JND value by subtracting a JND reference value from the first JND value, the JND reference value being determined based on a time required for a human to notice a luminance change according to a JND value;

determining a target luminance value using the second JND value, the target luminance value being lower than the reference luminance value; and generating a first driving signal using the target luminance value, the first driving signal to be applied to the light source.

2. A method of driving a light source, comprising:

converting a reference luminance value of the light source to a first lust noticeable difference (JND) value, JND values representing a minimum noticeable difference between two stimuli;

determining a target luminance value using the first JND value, the target luminance value being lower than the reference luminance value;

generating a first driving signal using the target luminance value, the first driving signal to be applied to the light source;

generating a second driving signal using the reference luminance value, the second driving signal to be applied to the light source; and outputting the first driving signal and the second driving signal according to a power source mode.

3. The method of claim 2, wherein the first driving signal is outputted when the power source mode is a battery mode, the second driving signal is outputted when the power source mode is an external power source mode, and a level of the second driving signal is greater than a level of the first driving signal.

4. The method of claim 3, wherein the first driving signal and the second driving signal are alternately outputted in response to the battery mode.

5. The method of claim 4, wherein the first driving signal is continuously outputted in response to a user input signal to output the first driving signal, and the first driving signal is outputted in response to the user input signal or when a reference interval expires without receiving the user input signal.

6. A method of displaying an image, comprising:

analyzing an input image to compensate a color temperature of the input image;

displaying the compensated input image on a display panel;

converting a reference luminance value of a light source to a first just noticeable difference (JND) value, the light source configured to provide light to the display panel, and JND values representing a minimum noticeable difference between two stimuli;

determining a second JND value by subtracting a JND reference value from the first JND value, the JND reference value being determined based on a time required for a human to notice a luminance change according to a JND value;

determining a target luminance value that is less than the reference luminance value using the second JND value;

generating a first driving signal using the target luminance value and applying the first driving signal to the light source; and providing the light to the display panel in response to the first driving signal.

7. A method of displaying an image, comprising:

analyzing an input image to compensate a color temperature of the input image;

compensating a color temperature of the input image by increasing the color temperature of an achromatic color image comprising a grayscale greater than or equal to a reference grayscale when a ratio of the achromatic color image in the input image is greater than a reference ratio;

displaying the compensated input image on a display panel;

converting a reference luminance value of a light source to a first lust noticeable difference (JND) value, the light source configured to provide light to the display panel, and JND values representing a minimum noticeable difference between two stimuli;

determining a target luminance value lower than the reference luminance value using the first JND value;

generating a first driving signal using the target luminance value and applying the first driving signal to the light source; and providing the light to the display panel in response to the first driving signal.

8. A method of displaying an image, comprising:

analyzing an input image to compensate a color temperature of the input image;

displaying the compensated input image on a display panel;

converting a reference luminance value of a light source to a first just noticeable difference (JND) value, the light source configured to provide light to the display panel, and JND values representing a minimum noticeable difference between two stimuli;

determining a target luminance value lower than the reference luminance value using the first JND value;

generating a first driving signal using the target luminance value and applying the first driving signal to the light source;

generating a second driving signal using the reference luminance value, the second driving signal to be applied to the light source;

outputting the first driving signal and the second driving signal according to a power source mode; and providing the light to the display panel in response to the first driving signal and the second driving signal.

9. The method of claim 8, wherein the first driving signal is outputted when the power source mode is a battery mode, the second driving signal is outputted when the power source mode is an external power source mode, and a level of the second driving signal is greater than a level of the first driving signal.

10. The method of claim 9, wherein the first driving signal and the second driving signal are alternately outputted in response to the battery mode.

11. The method of claim 10, wherein the first driving signal is continuously outputted in response to a user input signal to output the first driving signal, and the first driving signal is outputted in response to the user input signal or when a reference interval expires without receiving the user input signal.

12. A display apparatus, comprising:

a display panel to display an image;

a light source part comprising a light source configured to provide light to the display panel;

a luminance determining part to convert a reference luminance value of the light source to a first just noticeable difference (JND) value, to determine a second JND value by subtracting a JND reference value from the first JND value, and to determine a target luminance value using the second JND value, the target luminance value being lower than the reference luminance value, and the JND values representing a minimum noticeable difference between two stimuli; and a light source driver to generate a first driving signal corresponding to the target luminance value and to apply the first driving signal to the light source, wherein the JND reference value is determined based on a time required for a human to notice a luminance change according to a JND value.

13. A display apparatus comprising:

a display panel to display an image;

a light source part comprising a light source configured to provide light to the display panel;

a luminance determining part to convert a reference luminance value of the light source to a first lust noticeable difference (JND) value and to determine a target luminance value using the first JND value, the target luminance value being lower than the reference luminance value, and JND values representing a minimum noticeable difference between two stimuli; and a light source driver to generate a first driving signal corresponding to the target luminance value and to apply the first driving signal to the light source; and a light source controller to output the reference luminance value and the target luminance value to the light source driver according to a power source mode, wherein the light source driver generates a second driving signal corresponding to the reference luminance value.

14. The display apparatus of claim 13, further comprising:

a color temperature compensator to compensate a color temperature of an achromatic color image comprising a grayscale greater than or equal to a reference grayscale when a ratio of the achromatic color image in the input image is greater than a reference ratio.

15. The display apparatus of claim 13, wherein the light source controller outputs the target luminance value when the power source mode is a battery mode, and the light source controller outputs the reference luminance value when the power source mode is an external power source mode.

16. The display apparatus of claim 13, wherein the light source controller alternately outputs the reference luminance value and the target luminance value when the power source mode is a battery mode.

17. The display apparatus of claim 16, wherein the light source controller continuously outputs the target luminance value in response to a user input signal to output the target luminance value, and the light source controller continuously outputs the target luminance value in response to the user input signal or when a reference interval expires without receiving the user input signal.

* * * * *